United States Patent [19]
Ackley

[11] Patent Number: 6,146,030
[45] Date of Patent: Nov. 14, 2000

[54] METHOD AND APPARATUS FOR PRINTING LAMINATED BAR CODE SYMBOLS AND OTHER SYMBOLS SUFFERING FROM SPECULAR REFLECTION DISTORTIONS

[75] Inventor: H. Sprague Ackley, Seattle, Wash.

[73] Assignee: Intermec IP Corporation, Beverly Hill, Calif.

[21] Appl. No.: 08/821,803

[22] Filed: Mar. 21, 1997

[51] Int. Cl.[7] .................................................. B41J 2/00
[52] U.S. Cl. ........................................ 400/103; 400/104
[58] Field of Search ................................ 400/103, 104; 283/61

[56] References Cited

U.S. PATENT DOCUMENTS

| | | | |
|---|---|---|---|
| 3,975,707 | 8/1976 | Ito et al. | 346/76 R |
| 4,567,488 | 1/1986 | Moriguchi et al. | 346/76 PH |
| 4,661,001 | 4/1987 | Takai et al. | 400/103 |
| 4,795,281 | 1/1989 | Ulinski, Sr. et al. | 400/74 |
| 4,824,266 | 4/1989 | Fujii et al. | 400/120 |
| 4,864,112 | 9/1989 | Imai et al. | 235/463 |
| 4,870,428 | 9/1989 | Kuwabara et al. | 346/76 PH |
| 4,937,590 | 6/1990 | Robillard et al. | 346/76 PH |
| 5,007,748 | 4/1991 | Lee et al. | 400/103 |
| 5,023,437 | 6/1991 | Speicher | 235/432 |
| 5,056,429 | 10/1991 | Hirosaki | 101/93.01 |
| 5,183,343 | 2/1993 | Tazawa et al. | 400/103 |
| 5,527,407 | 6/1996 | Gartland et al. | 156/64 |
| 5,564,841 | 10/1996 | Austin et al. | 400/103 |
| 5,676,473 | 10/1997 | Wright, IV et al. | 400/103 |
| 5,711,621 | 1/1998 | Austin | 400/120.13 |
| 5,751,257 | 5/1998 | Sutherland | 345/2 |
| 5,769,457 | 6/1998 | Warther | 283/61 |
| 5,777,314 | 7/1998 | Roustaei | 235/462 |
| 5,786,582 | 7/1998 | Roustaei et al. | 235/462 |
| 5,806,999 | 9/1998 | Kobayashi | 400/188 |
| 5,842,722 | 12/1998 | Carlson | 283/107 |

FOREIGN PATENT DOCUMENTS

| | | | |
|---|---|---|---|
| 0 329 369 A2 | 8/1989 | European Pat. Off. | 400/103 |
| 2 228 450 | 8/1990 | United Kingdom | 400/103 |

OTHER PUBLICATIONS

*Test, ANSI Symbol #5, Element Dimensions*, Intermac Corporation, Lynnwood Washington, May 27, 1987, pp. 1–33.

*American National Standard for Information Systems—Bar Code Print Quality—Guideline*, ANSI X3.182, 1990, pp. 1–29.

*Primary Examiner*—John S. Hilten
*Assistant Examiner*—Charles H. Nolan, Jr.
*Attorney, Agent, or Firm*—Perkins Coie LLP

[57] ABSTRACT

A method and associated apparatus prints bars of symbol characters comprised of a plurality of rows which are in turn comprised of a plurality of close adjacent dots to improve print quality and modulation when the symbol is printed on a media which is or can be laminated. The basic method includes removing a portion of one dot or more from an end of each of the plurality of rows of pairs of wide bars separated by an intervening space. As a result, the inside edges of the wide bars are reduced, thereby increasing the width of the intervening space, and resulting in improved symbol print quality.

30 Claims, 7 Drawing Sheets

660 nm. 06 mil Scanner

3352 Points Acquired     139 Elements Found

Code 39: *J 0000000021  
*

W/N Ratio = 2.5   OK!  
AverageBar = -.06X OK!  
Decodabilty = 81%  <A>  
Symbol Totals 202 X Prnt Con Sig = 99% OK!  
R(L)=82% R(D)=00% OK!  
Symbol Contr = 82%  <A>  
R(min)/R(max)= 00%  <A>  
Modulation = 56%  <C>  
EdgeCon(min) = 46%  <A>  
'Defects' = 08%   <A>

Test Mode: CODES  
MessageLength = 12 OK!  
- No Check Character -  
Message Format is OK!

Traditional Tests PASS  
Print Quality Grade <C>

| --Space-- | --Bar-- | --Space-- | --Bar-- | --Space-- | --Bar-- | --Space-- | --Bar-- | --Space-- | --Bar-- |
|---|---|---|---|---|---|---|---|---|---|
| 2612 | 269 | 754 | 278 | 317 | 714 | 318 | 720 | 313 | 278 |
| 324 | 274 | 320 | 277 | 318 | 734 | 751 | 719 | 309 | 267 |
| 301 | 266 | 728 | 711 | 292 | 266 | 294 | 689 | 286 | 258 |
| 288 | 259 | 277 | 256 | 665 | 654 | 279 | 641 | 270 | 244 |
| 274 | 252 | 261 | 243 | 640 | 600 | 252 | 599 | 247 | 225 |
| 253 | 220 | 250 | 211 | 584 | 552 | 236 | 556 | 212 | 207 |
| 216 | 203 | 209 | 197 | 510 | 490 | 214 | 494 | 218 | 187 |
| 222 | 191 | 220 | 189 | 530 | 503 | 217 | 498 | 208 | 184 |
| 207 | 181 | 204 | 173 | 487 | 458 | 199 | 453 | 195 | 169 |
| 201 | 162 | 192 | 167 | 451 | 435 | 190 | 433 | 189 | 169 |
| 188 | 165 | 194 | 166 | 471 | 462 | 203 | 491 | 211 | 188 |
| 226 | 199 | 219 | 535 | 577 | 213 | 248 | 221 | 251 | 586 |
| 247 | 595 | 250 | 224 | 637 | 229 | 269 | 238 | 278 | 649 |
| 304 | 254 | 753 | 285 | 329 | 774 | 320 | 758 | 340 | 292 |
| 2716 | | | | | | | | | |

660 nm. 06 mil Scanner

2694 Points Acquired   139 Elements Found

Code 39: *J 0000000021           Prnt Con Sig = 97% OK!           Test Mode: CODES
*                                R(L)=80% R(D)=01%  OK!           MessageLength = 12 OK!
                                 Symbol Contr = 79%  <A>          - No Check Character -
W/N Ratio = 2.3   OK!            R(min)/R(max)= 01%  <A>          Message Format is  OK!
AverageBar = -.09X OK!           Modulation = 71%    <A>
Decodabilty = 55%  <B>           EdgeCon(min) = 56%  <A>          Traditional Tests PASS
Symbol Totals 195 X              'Defects' = 11%     <A>          Print Quality Grade <B>

| --Space-- | --Bar-- | --Space-- | --Bar-- | --Space-- | --Bar-- | --Space-- | --Bar-- | --Space-- | --Bar-- |
|---|---|---|---|---|---|---|---|---|---|
| 2380 | 291 | 693 | 262 | 269 | 629 | 316 | 551 | 251 | 231 |
| 258 | 236 | 248 | 233 | 245 | 591 | 588 | 570 | 244 | 225 |
| 235 | 222 | 565 | 542 | 223 | 206 | 223 | 524 | 221 | 196 |
| 220 | 197 | 215 | 193 | 511 | 499 | 258 | 449 | 206 | 192 |
| 210 | 190 | 208 | 197 | 502 | 495 | 255 | 433 | 207 | 185 |
| 204 | 183 | 201 | 185 | 475 | 455 | 238 | 403 | 195 | 167 |
| 192 | 172 | 187 | 168 | 443 | 425 | 228 | 375 | 182 | 164 |
| 180 | 162 | 178 | 169 | 437 | 424 | 227 | 383 | 192 | 170 |
| 189 | 175 | 194 | 172 | 462 | 460 | 239 | 398 | 196 | 170 |
| 185 | 169 | 181 | 172 | 429 | 406 | 218 | 356 | 177 | 152 |
| 168 | 155 | 176 | 152 | 413 | 405 | 217 | 367 | 180 | 159 |
| 180 | 161 | 186 | 416 | 430 | 161 | 184 | 157 | 185 | 412 |
| 233 | 382 | 186 | 168 | 460 | 159 | 200 | 166 | 196 | 448 |
| 195 | 172 | 475 | 177 | 207 | 460 | 250 | 420 | 203 | 181 |
| 1752 |  |  |  |  |  |  |  |  |  |

METHOD AND APPARATUS FOR PRINTING LAMINATED BAR CODE SYMBOLS AND OTHER SYMBOLS SUFFERING FROM SPECULAR REFLECTION DISTORTIONS

TECHNICAL FIELD

This invention relates to printing bar codes and other machine-readable symbols and, more particularly, to a method of printing improved machine-readable symbols.

BACKGROUND OF THE INVENTION

Figure 1:
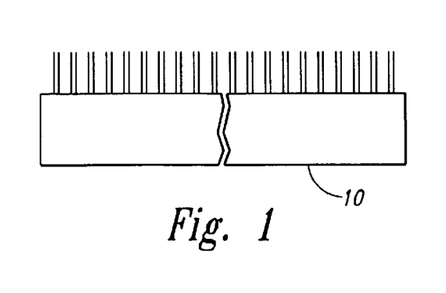
FIG. 1 is a simplified front view of a printhead such as a thermal printhead as employed in a bar code printer under an embodiment of the present invention.
Figure 2:
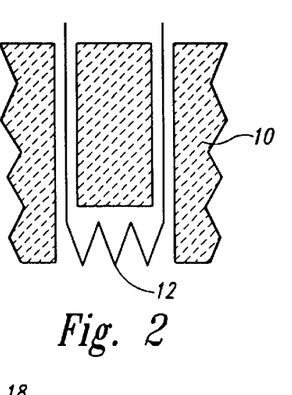
FIG. 2 is a simplified cutaway drawing of a thermal element in the printhead of FIG. 1 which "prints" one pixel position.
Figure 3:
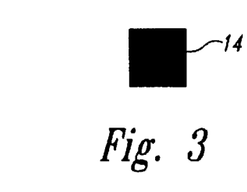
FIG. 3 is a simplified drawing of one exemplary pixel or "dot" as printed by the thermal element of FIG. 2.

Bar codes and other machine-readable symbols, as well as bar codes on many products, badges, and the like, are produced by on-demand printers. As depicted in FIG. 1, on-demand bar code printers employ a print assembly such as a thermal printhead 10 to print the bar codes on a media. As depicted in FIG. 2, the printhead 10 comprises a series of adjacent thermal elements 12 that print the pixels or dots on the surface of the media. The media can have a thermally activated surface which turns dark when subjected to heat or there can be a "ribbon" of "ink" which is transferred to and fused to the surface of the media by heat. In either case, the printer creates a dot 14, an example of which is depicted in FIG. 3, although other shapes for such dots are common.

Figure 4:
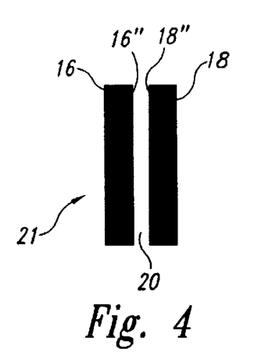
FIG. 4 is a simplified, enlarged drawing of two wide bars separated by a narrow space as employed in a typical bar code symbol.
Figure 5A:
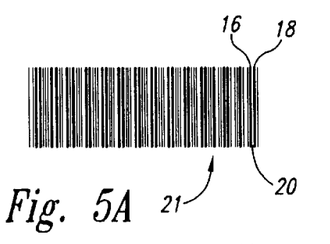
FIG. 5A is an exemplary, laminated Code 39 bar code symbol, containing the two wide bars and narrow space of FIG. 4.

As depicted in FIG. 4, various thermal elements 12 in the printhead 10 are selectively heated as the media passes beneath it, and a series of bars such as wide bars 16 and 18, separated by spaces such as narrow space 20, are created. The bars 16, 18 and space 20 are created in pre-established patterns as symbol characters which define the desired information. The bars 16, 18 and space 20 form part of a symbol 21, shown in FIG. 5A. FIG. 5A shows an exemplary laminated bar code symbol 21. The symbol 21 is a Code 39 symbol, and thus contains only elements having two widths, wide bars and spaces and narrow bars and spaces.

Bar code symbols are often laminated or positioned so that a reflective surface is placed thereover, so as to protect the underlying symbol. An "over-laminate" is typically a coating or material adhered to the scanning surface of a bar code symbol. The opacity, gloss (optical effects) and smoothness (physical effects) of the over-laminate affect the decodability of underlying symbols which is a measure of the "goodness" or accuracy of the symbol when received by the scanner. A laser beam or other light source passing over a laminated bar code symbol will cause some of the laser light to be scattered or absorbed by the laminate material. In other words, light reflects off the laminate or overlying transparent surface, producing specular reflection. As a result, the modulation print quality parameter of the symbol is degraded or reduced. The "modulation" of a symbol is the ratio of a minimum edge contrast to the overall symbol contrast. The "edge contrast" is the difference between the reflectance of a space and the reflectance of an adjoining, bar, where the minimum edge contrast is the smallest edge contrast in a profile produced from a scan of the symbol. The "symbol contrast" is the difference between the largest and smallest reflectances in a scan reflectance profile. The modulation in laminated bar code symbols is reduced particularly where spaces are surrounded by wide bars. These spaces appear duller than the quiet zones which surround the symbol, as well as less bright or more gray than other spaces within the symbol.

Figure 6:
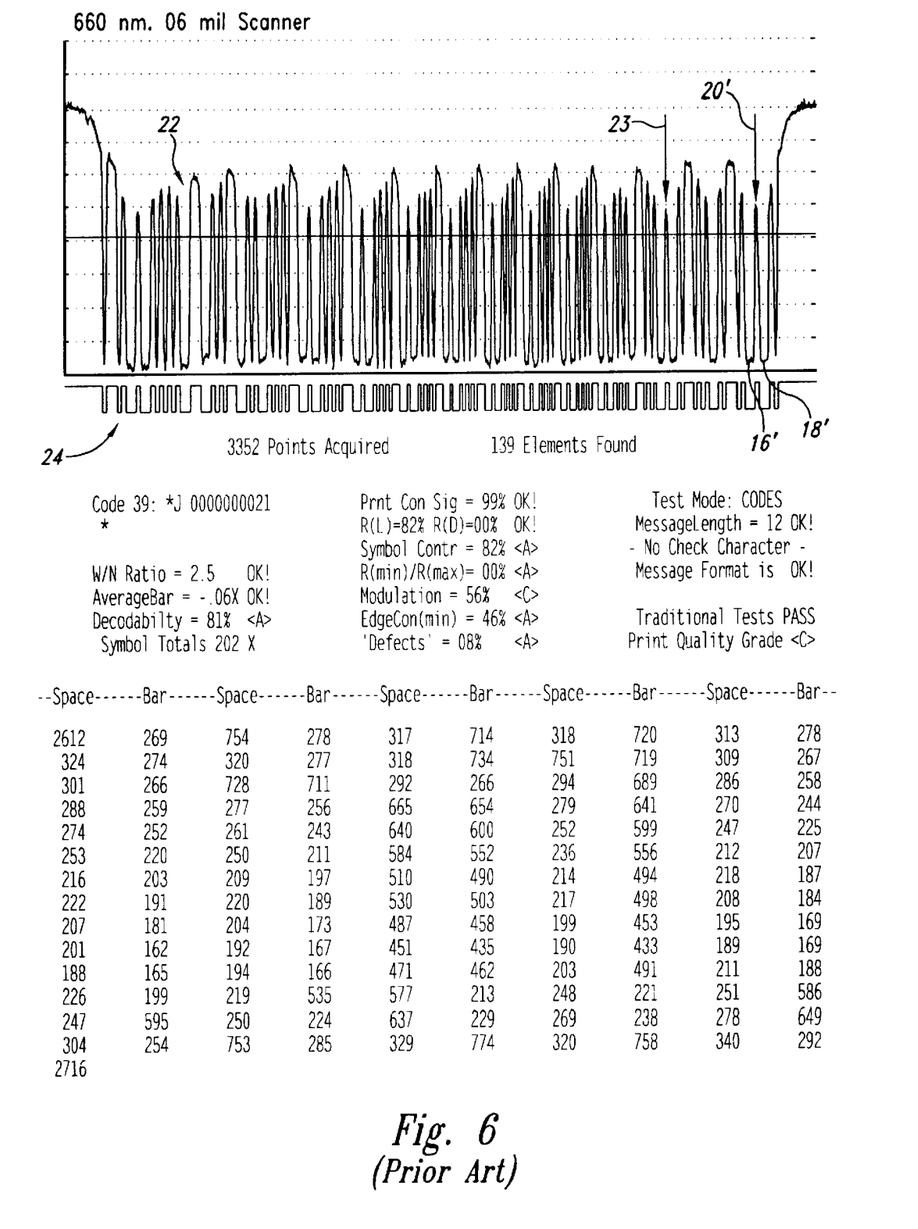
FIG. 6 shows a profile, waveform and print quality data produced from a wand scanner scanning, the symbol of FIG. 5A.
Figure 7:
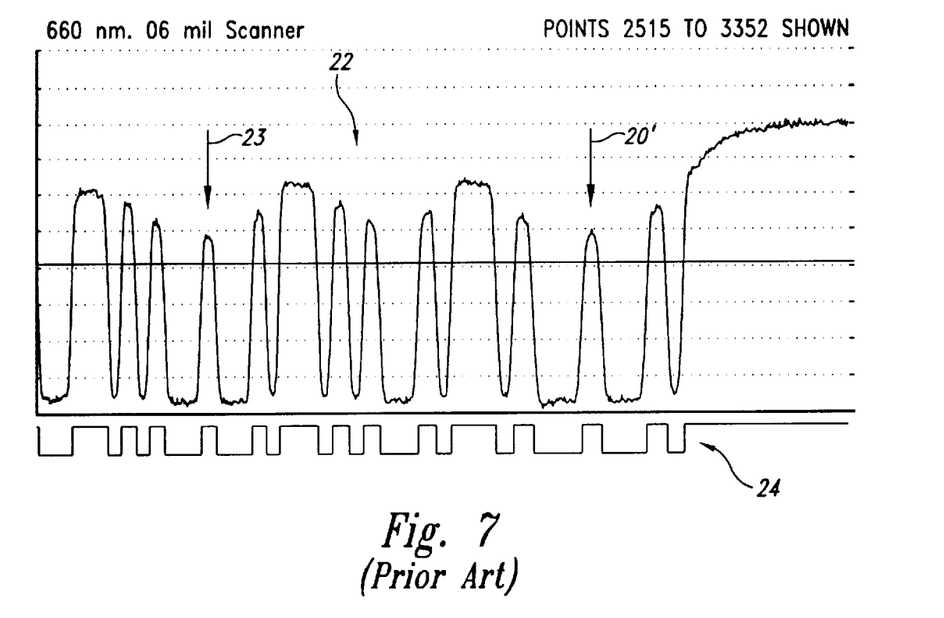
FIG. 7 is an enlarged view of the right-hand portion of the profile and waveform of FIG. 6.

For example, FIG. 6 shows an exemplary profile 22 as produced by a wand scanner from the laminated bar code symbol 21. Also shown in FIG. 6, below the profile 22, is a waveform 24 showing a thresholding or squaring off of the profile 22. Below the waveform 24, FIG. 6 shows printing, quality parameters for the profile 22, and space and bar counts derived from the profile. Importantly, the modulation of the profile 22 is only 56%, thereby having only a grade C rating. Such a low modulation is due, in part, to the reflectance of the laser beam from the laminate such as is produced by the relatively low peak 20' produced by the wide space 20 in the symbol 21. The surrounding wide bars 16 and 18 (FIG. 4) produce sufficiently low valleys 16' and 18' in the profile 22, as shown in greater detail in FIG. 7, which shows an enlarged view of the right-hand portion of the profile 22. A similar, relatively low peak 23 produced by a space in the symbol 21 is also bordered by two wide bars. The low peaks 20' and 23, relative to other peaks produced by other spaces, and the quiet zone, result in the low modulation value for the profile 22. As a result of the low modulation, the profile 22 has only an overall print quality grade of C.

SUMMARY OF THE INVENTION

One method to compensate for low modulation is to print the desired symbol with narrower bars so that the spaces are wider within the symbol. As a result, the spaces will produce greater peaks throughout. However, this method only serves to produce a symbol having a passing print quality level.

Under an embodiment of the present invention, a printer prints machine-readable symbols having at least wide and narrow shapes, with spaces between the shapes. The printer includes a print assembly, a memory, and print logic. The print assembly prints the wide and narrow shapes on a media surface in response to print signals. The media surface is capable of being, laminated. The memory has print definitions of the symbols wherein at least some of the wide shapes adjacent to an intervening space in a symbol have a reduced edge that is adjacent to the intervening space. A width of the reduced edge wide shape is narrower as compared to widths of other wide shapes in the symbol, or if the media surface were unlaminated. The print logic is coupled to the print assembly and the memory and outputs the print signals to the print assembly in response to the print definitions.

DETAILED DESCRIPTION OF THE INVENTION

A printing system, and in particular, an apparatus and method for printing machine-readable symbols composed of a plurality of closely adjacent dots, is described in detail herein. In the following description, numerous specific details are set forth such as specific linear symbols, specific printing methods, etc., in order to provide a thorough understanding of the present invention. One skilled in the relevant art, however, will readily recognize that the present invention can be practiced without certain of these specific details, or with other symbols, methods, etc. In other instances, well-known structures and operations are not shown or described in detail in order to avoid obscuring the present invention While the examples described herein are with respect to a thermal bar code printer, those of ordinary skill in the art will readily recognize and appreciate that the techniques of the present invention are applicable to any printer for printing machine-readable symbols, particularly symbols composed of a plurality of adjacent rows of multiple adjacent dots. For example, the present invention is equally applicable to inkjet or other printers employing ink droplets, and electrostatic or other laser-type printers that employ charged granular toner particles. Furthermore, the present invention is applicable to non-demand print methods such as photocomposed methods. Similarly, a simple linear bar code is used in the examples for ease of understanding and simplicity of the drawings only. The present invention can be used with any type of symbol, including linear ("typical" bar code symbols), stacked, and matrix (collectively, "machine-readable symbol").

Under the embodiments disclosed herein of the present invention, a printer eliminates or attenuates a column of dots or pixels in bars of a printed symbol, for each of two wide bars that are separated by a space. For example, as shown in FIG. 4, two wide bars 16 and 18 are separated by the space 20. When an over-laminate is positioned over the bars, the modulation characteristic or parameter of the space 20 is attenuated due to the adjacent wide bars 16 and 18, as noted above. Under the embodiments described herein of the present invention, inner or adjacent edges 16' and 18', which are adjacent to or face the space 20, are reduced or "shaved." As a result, the resulting space 20 is wider and thus appears brighter when scanned by a laser scanner or otherwise imaged by a reader. A "wide bar pair" as used generally herein corresponds to two bars having two or more modules each, which are positioned on opposite sides of a space positioned therebetween.

Figure 8:
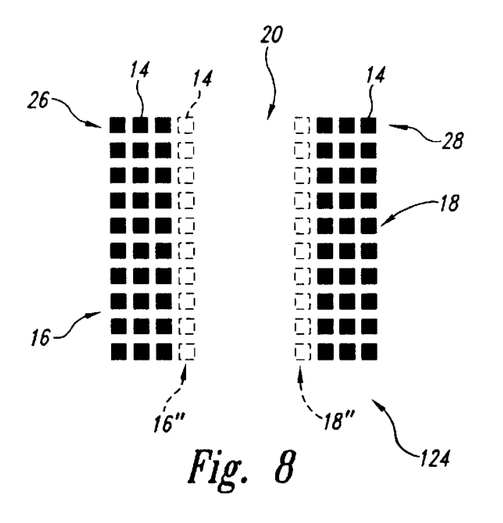
FIG. 8 is a simplified enlarged drawing of the bars printed according to an embodiment of the present invention with rows of pixels of the wide bars surrounding the space of FIG. 4 "shaved" or reduced.

As depicted in FIG. 8, bars in a symbol, such as the bars 16 and 18, are typically formed of a plurality of horizontal rows 26 of multiple dots 14. According to the present invention, when two wide bars 16, 18 are positioned on opposite sides of an intervening space 20, the widths of the two bars are reduced by eliminating a portion, reducing or attenuating the size of a dot 14, or eliminating one dot 14, or more (collectively, "shaving"), from each row 26. Only dots that are adjacent to the intervening space, i.e., the inner edges 16" and 18", are shaved. While two-wide bars 16, 18 are shown separated by a one-wide space 20, the bars may be greater than two modules, and the space can be of any width. The resulting space 20, between the shaved wide bars 16 and 18 is wider than if the inner edges 16" and 18" of the wide bar pair were not shaved. As a result, the wider space 20 appears brighter to a laser scanner and thereby increases its edge contrast with respect to the adjacent wide bars and causes the modulation grade of the symbol to improve by one or more grade levels (e.g., from a C grade to a B grade). From tests to date, it has been found that most common modulation problems as described above can be virtually eliminated by simply shaving one dot 14 from the inner edges 16" and 18" of wide bars adjacent to a space as depicted in FIG. 8 without negatively affecting decodability.

Figure 5B:
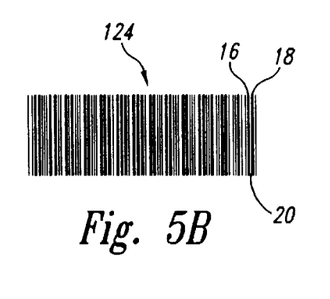
FIG. 5B is an exemplary, laminated Code 39 symbol, similar to the symbol of FIG. 5A, printed under an embodiment of the present invention.
Figure 9:
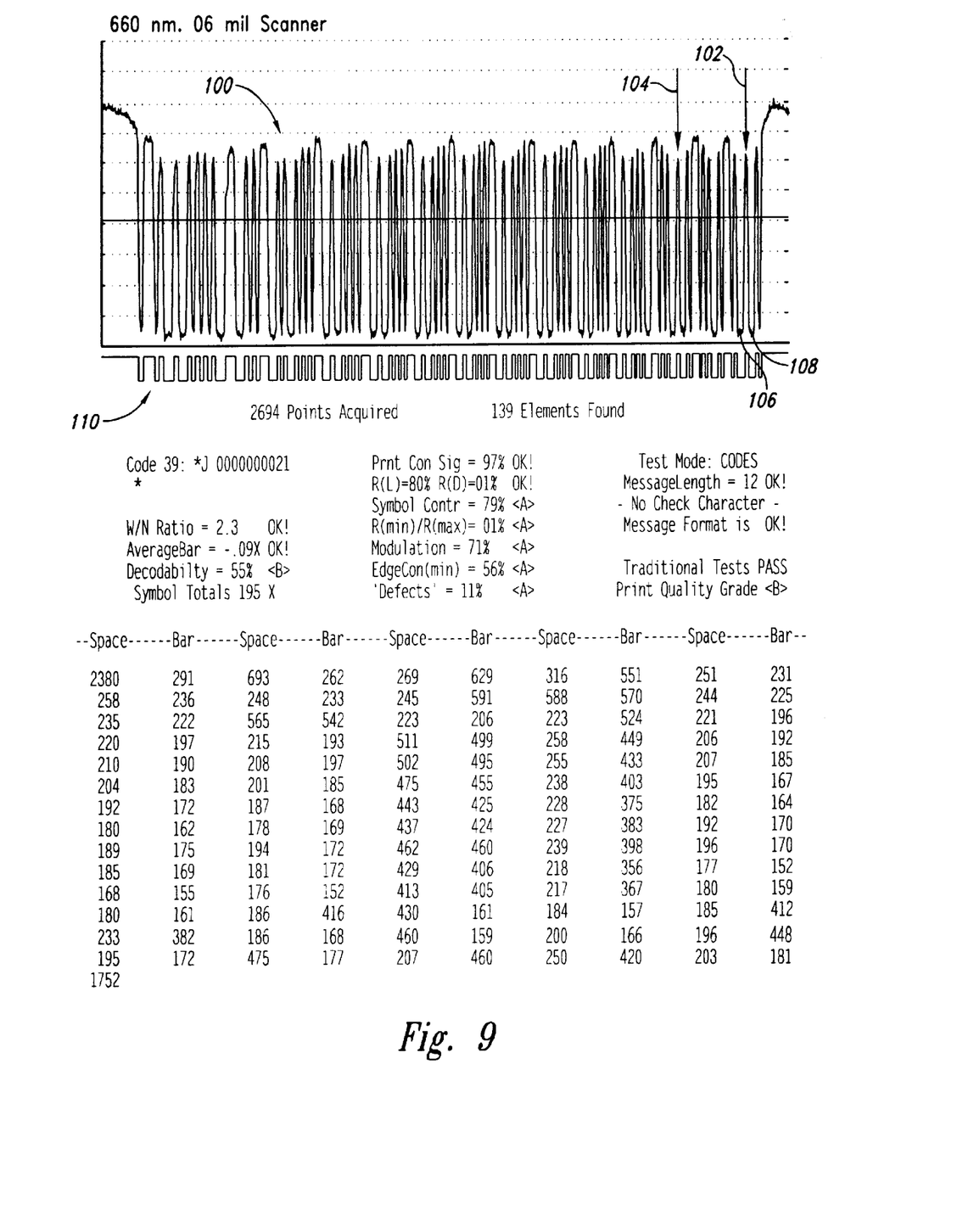
FIG. 9 is a profile, waveform, bar and space counts and printing parameters of the symbol of FIG. 5B.
Figure 10:
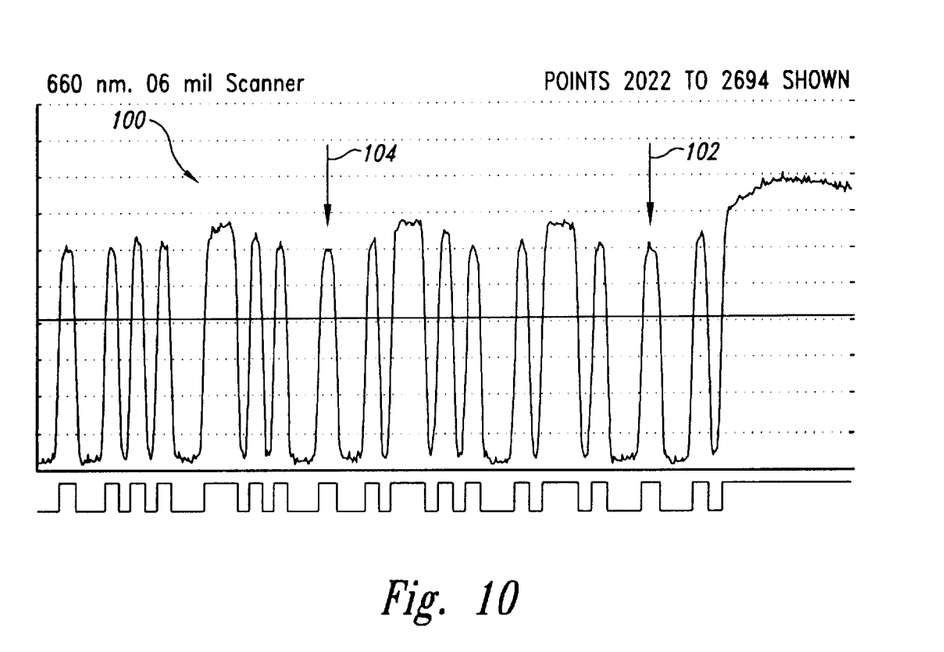
FIG. 10 is an enlarged view of the right-hand portion of the profile and waveform of FIG. 9 showing the thirty-four right-handmost elements of the symbol of FIG. 5B.

According to FIGS. 9 and 10, a profile 100 is shown as produced from a symbol 124 of FIG. 5B where inner edges 16" and 18" of wide bars 16 and 18 adjacent to a space 20 have been shaved under an embodiment of the present invention. FIG. 9 also shows additional print parameters and a waveform 110 for the symbol 21. The profile 100 shows, for example, a peak 102, which has a higher amplitude than the similar peak 20' of FIG. 6 (shown more clearly by comparing FIG. 10 with FIG. 7). Valleys 106 and 108, adjacent to the peak 102, which are produced by the wide bars 16 and 18, are still sufficiently low. A peak 104 likewise has a sufficient amplitude, unlike the similar peak 23 of FIG.

6. The peaks produced from spaces surrounded by shaved wide bars, such as the peaks 102 and 104, have amplitudes almost as high as other peaks produced by other spaces in the profile 100, and thus are nearly identical in reflectance to the other spaces. Overall, the profile 100 has a modulation of 71%, resulting in an A grade. As a possible tradeoff, however, the decodability of the profile 100 drops from 81% (grade A) of FIG. 6, to 55% (grade B) as shown in FIG. 9. Nevertheless, the print quality grade of the symbol 21 which produces a profile 100 has an overall B grade. The resulting overall print quality grade is still better than with prior laminated printed symbols.

The decrease in decodability can be as much as a full grade level, particularly for ratios of wide to narrow elements of 2.5 modules or less. For ratios greater than 2.5, the reduction in decodability is insufficient to reduce the grade, and thus the symbol 21 printed under the present invention can maintain an A grade. If the ratio of the symbol 21 between wide and narrow elements for the symbol was 3 or greater, then the overall symbol grade would be A under the present invention, while the same symbol, printed under prior art methods, would cause the print quality grade to drop to a D grade.

While layout or font of the particular symbols to be printed under the present invention can be designed and used by the user is to be included within the scope and spirit of the patent coverage afforded the present invention, in modern label printers a more automated approach is preferred. Several automated wide bar pair shaving systems according to the present invention will now be described.

Figure 11:
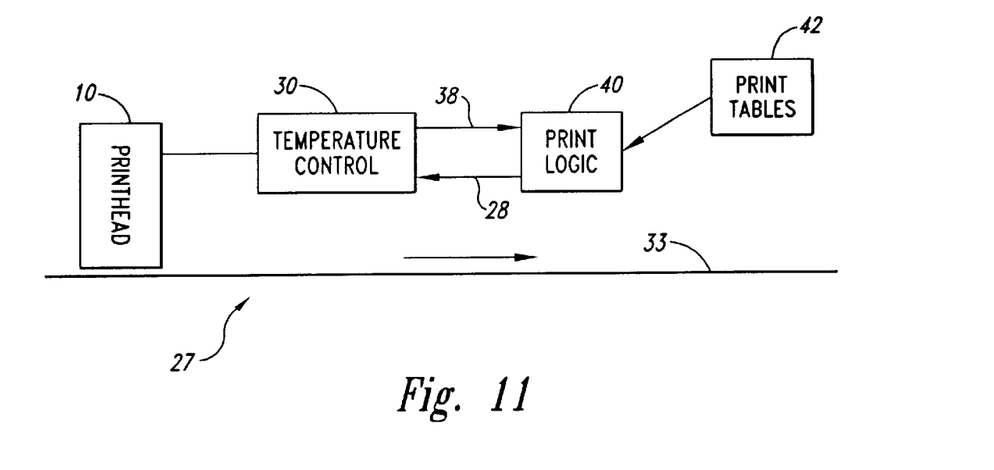
FIG. 11 is a simplified drawing of a printing system according to the present invention.

According to one embodiment of the present invention as depicted in FIG. 11, a printer 27 includes the printhead 10, an optional temperature control 30, print logic 40 and print tables 42. A print signal on a line 28 provided from the print logic 40 controls the temperature control 30 so that, in response thereto, the printhead 10 prints appropriate bars on the surface of a print media 33. A feedback signal is provided on a line 38 from the temperature controller 30 to the print logic 40 to control printing, The print logic 40 selects an appropriate symbol character print definition or font from the print tables 49 in a manner to be discussed in greater detail below. The print tables 42 contain logic for the print logic 40 that instructs the printer 27 to print each symbol character. In one or more symbologies. Importantly, the print tables 42 instruct the printer 27 to print all wide bar pairs in all symbol characters with their inner edges 16" and 18" shaved.

The bar code printer 27 can print the symbol 124 in one of two modes—drag mode or picket fence mode. In the drag mode depicted in FIGS. 12 and 13, the printhead 10 prints the bars, such as the wide bars 16 and 18, simultaneously by printing each row 26 of dots 14 for all the bars at the same time. Thus, each dot position is "dragged" along the length of its associated bar. In the drag mode, the present invention can be implemented by subtracting at least a portion of one dot 14 or more from inner edges 16" and 18" of all wide bar pairs.

Figures 12, 13, 14, 15:
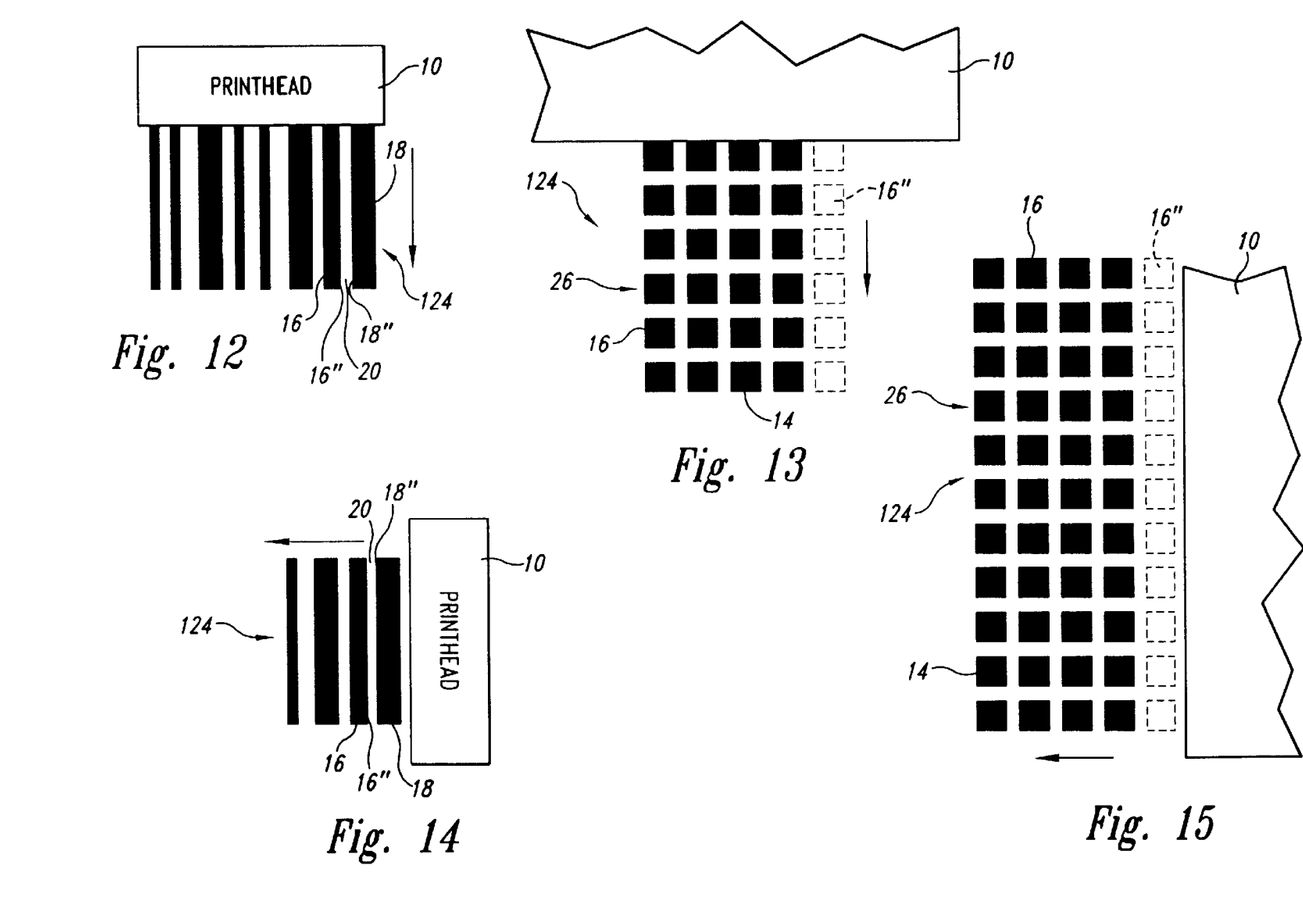
FIG. 12 is a simplified drawing of a label printed in a "drag" mode by a printer such as the printer of FIG. 10.
FIG. 13 is a simplified greatly enlarged drawing of a printhead printing a bar in the manner of FIG. 12 and depicting how the present invention is implemented in the drag mode.
FIG. 14 is a simplified drawing of a label printed in a "picket fence" mode by a printer such as the printer of FIG. 10.
FIG. 15 is a simplified greatly enlarged drawing of a printhead printing a bar in the manner of FIG. 14 and depicting one way in which the present invention can be implemented in the picket fence mode.

A more common printing approach is the "picket fence" printing technique of FIG. 14. Each vertical column of dots 14 for a vertical bar such as the bar 16 is printed simultaneously. That is, one vertical column of dots 14 for all rows 26 in the bar 16 are printed simultaneously. Thus, the symbol 21 is printed from end to end rather than from top to bottom (or bottom to top) as was the case with the drag mode. The picket fence approach offers several ways of implementing the present invention which are not available in the drag mode. One could, of course, implement the present invention by subtracting at least a portion of one whole column (or more) of dots 14 as depicted in FIG. 15.

Figure 16:
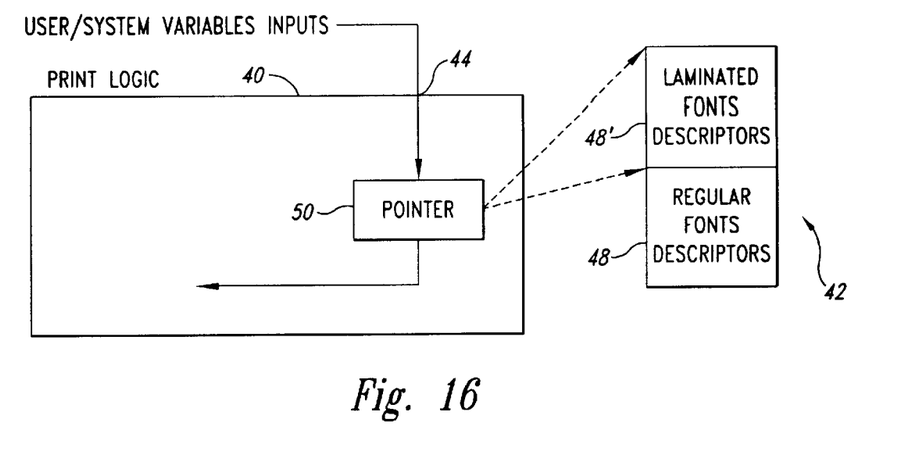
FIG. 16 is a simplified drawing depicting an exemplary system of implementing font shaving through a selective look-up table.

While font physiology could be calculated in real-time from a basic font definition, slower computers or microprocessors typically employed in low-cost printers would make such an approach impractical in most cases. Users typically don't want to wait while their printer "thinks" about what it is going to print. Instead, they want to push a button and receive a printed label immediately. Thus, a table look-up approach depicted in FIG. 16 is a preferred implementation of the present invention. The fonts of symbol characters in a symbology are pre-defined in the print tables 42, which are preferably a memory. The print tables 49, in one embodiment, contain two sets of print or font definitions, one set of font definitions 48 for symbols printed on unlaminated media, and one set of font definitions 48' for shaved fonts or laminated media. In the exemplary implementation, the font definition 48 has no shaving of wide bar pairs, while the font definition 48' removes one dot 14 of each row for such wide bars. The fonts being used to print are accessed through a pointer 50 which is changed by the print logic 40 as a function of a user input or an appropriate system variable input at 44 (explained below). Of course, the printer 27 can be configured to print only laminated symbols. As a result, the print tables 42 only include font descriptors having fonts or symbols in the symbology where inner edges of wide bar pairs are shaved.

Figure 17:
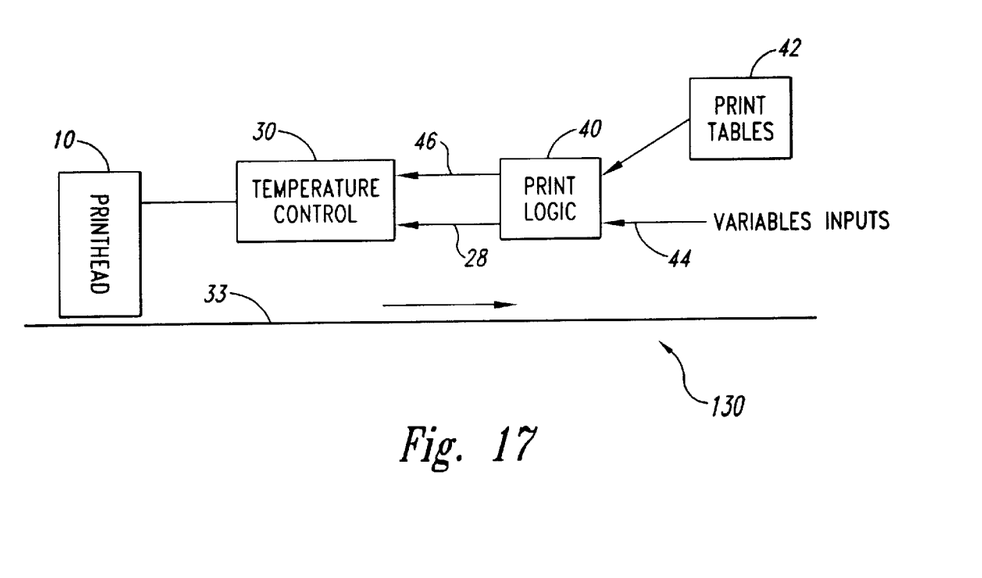
FIG. 17 is a simplified drawing of a first alternative embodiment of a printing system according to the present invention.

Under an alternative embodiment of the present invention as depicted in FIG. 17, the print logic 40 of a printer 130 is provided with inputs of other system variables on input line 44. Such inputs could include system speed, font orientation, media type, ink type, i.e., anything which could affect print quality and require font shaving under certain conditions. The system variables could also be used by the print logic 40 to automatically adjust the temperature controller 30 as necessary using, input line 46. Alternatively, the embodiment of the present invention depicted in FIG. 12 can include a reader (not shown) that reads the symbol printed by the printhead 10 and provides a feedback signal to the print logic over the input line 44 to appropriately control symbol printing.

Figure 18:
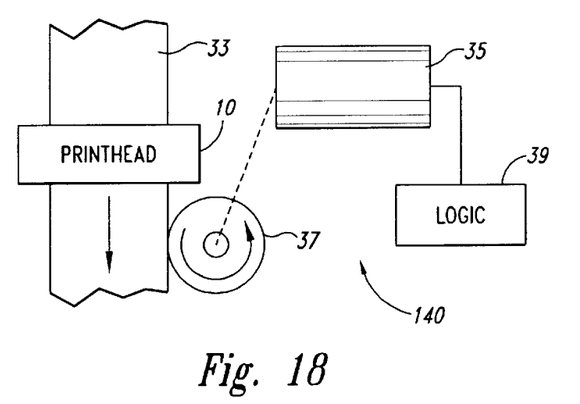
FIG. 18 is a simplified drawing of a second alternative embodiment of a printing system according to the present invention.
Figure 19:
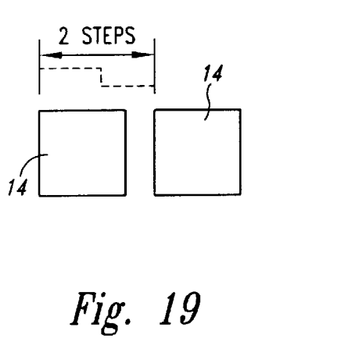
FIG. 19 is a greatly enlarged and simplified drawing of two adjacent dots depicting how there are at least two steps of the stepping motor employed to move the media between dot printing positions in the usual manner of printing in the picket fence mode.
Figure 20:
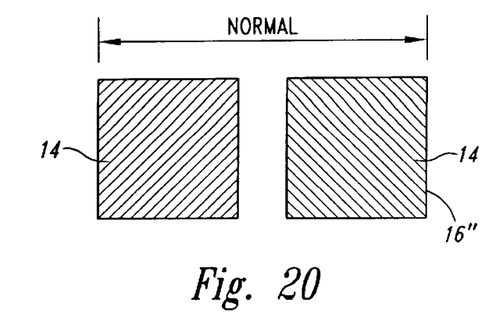
FIG. 20 is a greatly enlarged and simplified drawing of two adjacent dots depicting the outside width thereof when they are printed normally in the picket fence mode.
Figure 21:
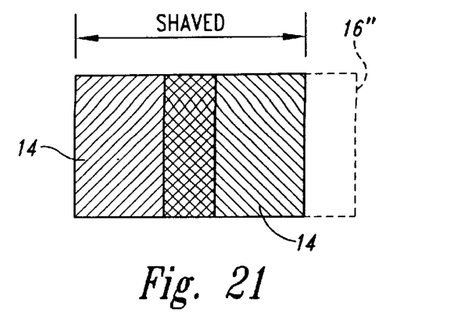
FIG. 21 is a greatly enlarged and simplified drawing of two adjacent dots depicting an outside edge thereof shaved when they are printed in the picket fence mode by the printing system of FIG. 18.

Under a second alternative embodiment of the present invention as depicted in FIG. 18, a printer 140 for printing in the picket fence mode includes a drive system having a stepping motor 35 and drive roller 37 for moving the laminated print media 33. The laminated print media 33 is moved in steps by the stepping motor 35 driving, the drive roller 37, or the like, operably connected to move the media 33. The stepping motor 35 is driven by logic 39. Typically, there are two steps of the stepping motor 35 between print position of adjacent dots 14 as depicted in FIG. 19. To produce a "normal" bar, all the dots 14 in each row 26 are spaced by two steps of the stepping motor 35 as depicted in FIG. 20. To produce a "shaved" bar, on the other hand, at least the last vertical column of dots 14 in a picket fence printed bar (such as shown in FIG. 15) is spaced by only one step of the stepping motor 35, as depicted in FIG. 21. This, as can be appreciated by comparing FIGS. 20 and 21, the inside edge 16" of the bar 16 can be reduced or moved leftward by a portion of a dot (rather than a full dot) by printing the last dot at one step distance instead of two. In other words, the print logic 40 instructs the motor 36 to slow while printing the inside edge of wide bar pairs. The inside edge 18" of a bar 18 can similarly be reduced to thereby decrease the widths of the wide bars in the wide bar pair, and increase the width of the intervening space. This technique of bar width reduction could have particular applicability in lower resolution printers employing say 200 dpi where the removal of a full dot from the width of bar pairs being printed could adversely affect the print quality while a partial dot modification improves the quality. Details of the operation of the printer 140 is more fully described in a co-pending application by the inventor herein entitled DOT PRINTERS WITH WIDTH COMPRESSION CAPABILITIES, application number 08/518,226 and assigned to the common assignee of this application, the teachings of which are incorporated herein by reference.

The above-described embodiments of the present invention each print a complete dot 14. However, under a third embodiment of the present invention, the printer 27 of FIG. 11 can apply less power, or power over a shorter period of time, so as to print smaller dots 14. In the picket fence mode, the print logic 40 and temperature control 30 cause each of the printhead heating elements 12 in the printhead 30 to receive the same amount of current. The print tables 42 employed by the print logic 40 are set up as a function of time. Thus, to make a column of dots 14 across the printhead 10 smaller, the time of power application is increased or decreased slightly. Consequently, the print tables 42 instruct the print logic 40 and temperature control 30 to decrease the time that power is applied to the printhead elements 12 for the inside edges 16" and 18" for each wide bar pair.

In drag mode, one or more individual printhead elements 12 receive reduced power while printing a column of dots. The print tables 42 employed by the print logic 40 are set up as a function of power. Thus, to make a column of dots 14 smaller, the level of power application is decreased slightly. Consequently, at least two printhead elements 12 at inside edges 16" and 18" of wide bar pairs receive less power than other printhead elements (which print bars), based on definitions in the print tables 42.

Although specific embodiments of, and examples for, the present invention are described herein for illustrative purposes, various equivalent modifications can be made within the spirit and scope of the invention, as those skilled in the relevant art will recognize. The teachings provided herein of the present invention can be applied to other printing systems and printing of dot-oriented materials. As a result, the present invention can easily be adapted to other dot printing, devices such as inkjet, bubble jet, electrostatic and the like. Additionally, the present invention can easily be adapted to other non-demand printing devices, such as photocomposed printers or ion deposition printers. Photocomposed printers often produce labels on a media substrate such as photographic print material which has inherent lamination.

Moreover, while the present invention has been generally described above as reducing or eliminating dots in printed images the present invention can be readily adapted to reduce the widths of wide bar pairs to increase the width of the intervening space by printing systems which algorithmically generate bars. Under such an alternative, the print logic 40 reduces an inside edge of the wide bars, each of which are algorithmically defined by equations for areas of rectangles. Furthermore, while embodiments of the present invention have been generally described above as reducing or eliminating a column of dots from opposite inside edges of wide bar pairs, only one edge of each wide bar pair can be reduced or eliminated.

These and other changes call he made to the invention in light of the above detailed description. In general, in the following, claims, the terms used should not be construed to limit the invention to the specific embodiments disclosed in the specification and the claims, belt should be construed to include all printing systems and methods of printing that provide improved print quality improved modulation, etc. Accordingly, the invention is not limited by the disclosure, but instead its scope is to be determined entirely by the following claims.

Wherefore, having thus described the present invention, what is claimed is:

1. A bar code printer for printing bar code characters having at least wide and narrow bars and spaces between the bars, the bars being comprised of a plurality of rows which are in turn comprised of a plurality of close adjacent dots, the printer comprising:

(a) a thermal printhead including a plurality of thermal print elements for printing bar code characters on a media surface, the media surface being laminated;

(b) a memory having print definitions of the bar code characters wherein each pair of wide bars adjacent to an intervening space in a bar code character has at least a portion of one dot per row adjacent to the intervening, space eliminated as compared to other wide bars in the bar code characters, and (c) print logic coupled to the printhead and the memory and outputting character print signals to the printhead in response to the print definitions, and wherein the printhead prints bar code characters on the media surface in response to the character print signals.

2. The printer of claim 1 wherein the memory includes additional print definitions of the bar code characters wherein each pair of wide bars adjacent to an intervening space does not have at least a portion of one dot eliminated adjacent to the intervening space, and wherein the print logic employs the additional print definitions if the media surface is not to be laminated.

3. The printer of claim 1 wherein the bar code characters have a plurality of wide bars, and wherein the print definitions of the bar code characters define all of the pairs of wide bars adjacent to an intervening space in a symbol as having, a shaved edge.

4. The printer of claim 1, further comprising:

an input to the print logic receiving indications of system variables which influence print quality of bar code characters being produced by the printhead; and wherein the print logic adjusts the character print signals based on the system variables.

5. The printer of claim 1 wherein the print logic decreases a power or duration of the character print signals applied to the printhead to attenuate printing of the at least a portion of one dot from each pair of wide bars adjacent to the intervening space.

6. The bar code printer of claim 1, further comprising a motor that moves the media surface past the printhead, wherein the motor is coupled to and controlled by the print logic, and wherein the print logic slows movement of the motor during printing of the at least a portion of one dot from each of the pairs of wide bars.

7. A printer for printing machine-readable symbols having at least wide and narrow shapes and spaces between the shapes, the printer comprising:

a print assembly that prints the wide and narrow shapes on a media surface in response to print signals, the media surface capable of being laminated;

a memory having print definitions of the symbols wherein at least one of each pair of wide shapes adjacent to an intervening space in a symbol has a reduced edge that is adjacent to the intervening space, wherein a width of the reduced edge wide shape is narrower as compared to widths of other wide shapes in the symbols; and print logic coupled to the print assembly and the memory and outputting the print signals to the print assembly in response to the print definitions.

8. The printer of claim 7 wherein the memory includes additional print definitions of the symbols wherein at least one of each pair of wide shapes adjacent to an intervening space in a symbol does not have a reduced edge that is adjacent to the intervening space, and wherein the print logic employs the additional print definitions if the media surface is not to be laminated.

9. The printer of claim 7 wherein the shapes are comprised of a plurality of rows which are in turn comprised of a plurality of close adjacent dots, and wherein the print definitions define at least one of each pair of wide shapes in a symbol as having at least a portion of one dot per row adjacent to the intervening space eliminated.

10. The printer of claim 7 wherein the print assembly includes a thermal printhead having a plurality of print elements.

11. The printer of claim 7 wherein the symbols have a plurality of wide shapes, and wherein the print definitions of the symbols define each pair of wide shapes adjacent to an intervening space in a symbol as having a reduced edge.

12. The printer of claim 7, further comprising:

an input to the print logic receiving indications of system variables which influence print quality of symbols being produced by the print assembly; and wherein the print logic adjusts the print signals based on the system variables.

13. The printer of claim 7 wherein the print assembly includes a thermal printhead having a plurality of print thermal print elements, wherein at least some of the print elements print each shape, and wherein the print logic decreases a power or duration of print signals applied to the printhead to attenuate printing of an edge of each pair of wide shapes adjacent to the intervening space.

14. The printer of claim 7 wherein the print assembly includes a printhead that prints the shapes on the media surface and a motor that moves the media surface past the printhead, wherein the motor is coupled to and controlled by the print logic, and wherein the print logic decreases movement of the motor during printing of the reduced edge of each of the pairs of wide shapes.

15. A method of printing symbol characters having a plurality of bars separated by spaces, the bars having at least a wide and a narrow width and being comprised of a plurality of close adjacent dots, the method comprising:

removing a portion of one dot or more from edges of each pair of wide bars adjacent to a space positioned therebetween; and producing a symbol having the symbol characters formed on a substrate to be laminated, wherein modulation between light reflected from the bars and spaces thereof by optical reading apparatus is improved.

16. The method of claim 15 wherein removing a portion of one dot or more includes moving the substrate one-half of a step during printing of the edges adjacent to the space between each pair of wide bars.

17. The method of claim 15 wherein removing a portion of one dot or more includes decreasing a power or duration of energization of a printhead during printing of the edges adjacent to the space of each pair of wide bars.

18. The method of claim 15, further comprising:

optically determining a read quality of bars being printed by a printhead; and adjusting a printing of the symbol based on the read quality of the bars being printed.

19. The method of claim 15, further comprising:

receiving indications of system variables which influence print quality being produced by a printhead; and adjusting a printing of the symbol based on the system variables.

20. The method of claim 15 wherein removing at least a portion of one dot or more includes:

maintaining a table of symbol character font descriptors for normal fonts and fonts with one less dot per edges of each wide bar pair;

using the normal fonts when the bars are printed on an unlaminated substrate; and using the fonts with one less dot per edges for each of the wide bar pairs when the bars are printed on a substrate to be laminated.

21. The method of claim 15 wherein at least the wide bars are comprised of a plurality of rows which are in turn comprised of a plurality of close adjacent dots, and wherein removing a portion of one dot or more includes eliminating a last dot from each of the plurality of rows of the edges of the pairs of wide bars.

22. A method of printing machine-readable symbols having a plurality of shapes separated by spaces, the shapes having at least a wide and a narrow width, the method comprising:

reducing an inner edge of at least one wide shape, but maintaining widths of shapes having the narrow width; and controlling printing of a machine-readable symbol on a substrate based on the reduced inner edge of the at least one wide shape.

23. The method of claim 22, further comprising securing an over-laminate over the substrate after reducing an inner edge and controlling printing.

24. The method of claim 22 wherein controlling printing includes decreasing a power or duration of printing by a printhead of the inner edge of the at least one wide shape.

25. The method of claim 22 wherein reducing an inner edge includes maintaining a set of symbol descriptors for normal symbols and a set of symbol descriptors for symbols with at least one of the inner edges reduced for each pair of wide shapes; and wherein the step of controlling printing includes:

using the normal set of symbol descriptors when the substrate is unlaminated; and using the set of symbol descriptors with reduced inner edges for pairs of wide shapes when the substrate is to be laminated.

26. The method of claim 22 wherein at least the wide shapes are comprised of a plurality of rows which are in turn comprised of a plurality of close adjacent dots, and wherein reducing an inner edge includes eliminating a last dot from each of the plurality of rows of the edges of the pairs of wide shapes.

27. The method of claim 22 wherein controlling printing includes controlling printing of a machine-readable symbol on a substrate, the substrate having an over-laminate form thereon.

28. A method of printing machine-readable symbols having a plurality of shapes separated by spaces, the shapes having at least a wide and a narrow width, the method comprising:

provided a substrate;

laminating an over-laminate to a surface of the substrate, the over-laminate having an opacity sufficient to allow printing on a surface of the substrate to be visible;

reducing an inner edge of a plurality of wide shapes; and controlling printing of the machine-readable symbol on the surface of the substrate based on the reduced inner edge of the at least one wide shape.

29. The method of claim 28 wherein laminating an over-laminate to a surface of the substrate follows the controlling printing.

30. The method of claim 15, further comprising:

laminating the substrate.

* * * * *